United States Patent [19]

Matthies

[11] Patent Number: 5,149,758

[45] Date of Patent: Sep. 22, 1992

[54] CONTINUOUS PRODUCTION OF POLYCAPROLACTAM HAVING A REGULATED AMINO END GROUP CONTENT

[75] Inventor: Paul Matthies, Heidelberg, Fed. Rep. of Germany

[73] Assignee: Basf Aktiengesellschaft, Ludwigshafen, Fed. Rep. of Germany

[21] Appl. No.: 713,303

[22] Filed: Jun. 11, 1991

[30] Foreign Application Priority Data

Jun. 21, 1990 [DE] Fed. Rep. of Germany ....... 4019780

[51] Int. Cl.$^5$ .............................................. C08G 69/16
[52] U.S. Cl. .................................... 528/318; 528/323
[58] Field of Search ............................... 528/318, 323

[56] References Cited

U.S. PATENT DOCUMENTS 3,386,967 6/1968 Twilley .
3,839,530 10/1974 Bingham et al. .

Primary Examiner—Harold D. Anderson
Attorney, Agent, or Firm—Oblon, Spivak, McClelland, Maier & Neustadt

[57] ABSTRACT

Polycaprolactam having a regulated amino end group content is produced in a continuous process in which caprolactam is polymerized at 240°–290° C. in the presence of water as initiator and in the presence of a dicarboxylic acid as chain regulator by polymerizing caprolactam in a single stage in the presence of from 0.3 to 5% by weight of water and from 0.1 to 0.6% by weight of terephthalic acid and/or isophthalic acid, each percentage being based on caprolactam, at a uniform pressure through the entire polymerization time of from 1.0 to 1.9 bar, measured in the vapor phase above the polymerization zone, while maintaining a water content of from 0.1 to 0.5% by weight, until the sum total of the amino and carboxyl end group contents is from 115 to 150 meq/kg, with the proviso that the amino end group content does not drop below 25 meq/kg, measured on extracted polycaprolactam.

4 Claims, No Drawings

CONTINUOUS PRODUCTION OF POLYCAPROLACTAM HAVING A REGULATED AMINO END GROUP CONTENT

Polycaprolactam for fiber purposes is in general produced by polymerizing caprolactam in the presence of chain regulators such as acetic acid, propionic acid or benzoic acid in order to limit the molecular weight of the polyamide to a desired value and to ensure that the polyamide melt has a stable viscosity during processing. Chain regulators also have the function of setting the end group content of the polyamide, in particular the amino end group content, to a desired value. A defined constant amino end group content is necessary for the production of polyamide fibers to ensure a defined uniform dyeability.

U.S. Pat. No. 3,386,967 discloses polymerizing caprolactam in a multistage process in the presence of from 0.1 to 0.7 mol % of a dicarboxylic acid such as adipic acid, pimelic acid, sebacic acid, dodecanedioic acid or terephthalic acid to obtain a polycaprolactam having an average molecular weight of from 25,000 to 40,000. However, this process has the disadvantage that the polycaprolactam obtained gives rise to nubbing on melt spinning, as is known from U.S. Pat. No. 3,839,530, where it is consequently proposed that dicarboxylic esters be used as chain regulators. However, dicarboxylic esters are relatively volatile, so that a constant level of chain regulators is difficult to maintain.

The most important requirements in the large-scale production of nylon 6 are economy of the production process and satisfactory processing of the products.

It is an object of the present invention to increase the space-time yield of the polymerization of caprolactam in a continuous process without affecting the properties of the product in an adverse manner. For a given polymerization plant the space-time yield is reflected in the throughput and the extractables content of the product, the extractables content being a measure of the conversion.

For some applications it is desirable to have a polycaprolactam with a reduced amino end group content, for instance for grades which are to be differentially dyed together with other grades or for grades which are to possess increased resistance to soiling, as is required for example of carpet fibers. Although it is basically possible to reduce the amino end group content by increasing the concentration of the usual monocarboxylic acid chain regulators, this normally leads to an undesirable reduction in the attainable molecular weight and/or in the space-time yield.

It is a further object of the present invention to produce a polycaprolactam which has a reduced amino end group content without reducing the molecular weight and/or space-time yield.

We have found that these objects are achieved by a process for the production of polycaprolactam having a regulated amino end group content, in which caprolactam is polymerized at 240°-290° C. in the presence of water as initiator and in the presence of a dicarboxylic acid, which comprises polymerizing caprolactam in a single stage in the presence of from 0.3 to 5% by weight of water and from 0.1 to 0.6% by weight of terephthalic acid or isophthalic acid or of a mixture thereof, each percentage being based on caprolactam, at a uniform pressure through the entire polymerization time of from 1.0 to 1.9 bar, measured in the vapor phase above the polymerization zone, while maintaining a water content of from 0.1 to 0.5% by weight, until the sum total of the amino and carboxyl end group contents is from 115 to 150 meq/kg, with the proviso that the amino end group content does not drop below 25 meq/kg, measured on extracted polycaprolactam.

The novel process has the advantage of proceeding with a high space-time yield and of making possible the production of a fiber grade polyamide of uniform amino end group content and molecular weight. The novel process has the further advantage that the polycaprolactam thus produced does not contain any noticeable gel fractions which would lead to thick places and other problems in the production of filaments.

The polymerization of caprolactam is carried out in a single stage, preferably in an upright polymerization zone. Suitable apparatus is described for example in DE-B-24 48 100, DE-B-14 95 198 and EP-B-20 946. The polymerization is carried out in the presence of from 0.3 to 5% by weight of water, in particular of from 0.5 to 3,% of water, as initiator and from 0.1 to 0.6, in particular from 0.2 to 0.5,% by weight of terephthalic acid and/or isophthalic acid, each percentage being based on caprolactam. It is advantageous to introduce a mixture of the aforementioned starting materials at the top of the polymerization zone to ensure intimate mixing with the polymerizing melt.

It is an essential feature of the invention that the polymerization is carried out under a uniform pressure of from 1.0 to 1.9, in particular from 1.0 to 1.7, bar, measured in the vapor phase above the polymerization zone while a water content of from 0.1 to 0.5, in particular from 0.1 to 0.4, % by weight is maintained in the melt. It will be readily understood that the excess water introduced at the top of the reaction zone is continuously removed by distillation as a function of the employed pressure in order to maintain the aforementioned water content.

The polymerization is carried out at from 240 to 290° C. The polymerization time is in general from 8 to 12 hours. The polymerization is carried on until the sum total of the amino and carboxyl end group contents is from 115 to 150 meq/kg, with the proviso that the amino end group content does not drop below 25 meq/kg. Advantageously, the amino end group content is from 30 to 60 meq/kg. The polycaprolactam is advantageously removed from the polymerization zone at the lower end.

The amino and carboxyl group contents are measured on extracted polycaprolactam. The analytical extraction is carried out as follows:

100 parts by weight of polycaprolactam are extracted with 400 parts by weight of fully demineralized water at 100° C. for 32 hours and, after the water has been removed, dried under gentle conditions, i.e. without postcondensation, at 100° C. under reduced pressure for 20 hours.

The end group content is determined by an acidimetric titration. The amino groups are titrated with perchloric acid in 70:30 w/w phenol/methanol as solvent. The carboxyl groups are titrated with potassium hydroxide solution in benzyl alcohol as solvent. The relative viscosity RV of the polycaprolactam is determined in a 1% strength by weight solution in 96% strength by weight sulfuric acid at 25° C. In the Examples which follow, the percentages are by weight relative to the caprolactam used.

The process of the invention is illustrated in the following Examples, where A denotes the amino end group content, C the carboxyl end group content and RV the relative viscosity:

EXAMPLES

EXAMPLE 1

The polymerization reactor used was a reinforced plastic pipe with a mechanically mixed first reaction zone as described in EP 20 946. The pipe had a capacity of 340 l and was heated with an oil as heat transfer medium.

Molten caprolactam containing 0.5% by weight of water and 0.24% by weight of terephthalic acid as chain regulator was continuously introduced into the first reaction zone of the pipe under a gauge pressure of 0.5 bar with stirring (see Table 1). The throughput was 38 kg/h. The temperature of the first reaction zone was 270° C. The heat of polymerization generated in further reaction zones was removed by appropriate cooling with internal heat exchangers. The temperature of the last reaction zone was 265° C. The product had an extractables content of 11.0%. After extraction, the relative viscosity RV was 2.51, the amino end group content A was 46 meq/kg and the sum total A+C was 123 meq/kg. After plant drying with postcondensation, the RV was 2.72, A was 37 meq/kg and A+C was 106 meq/kg.

The product was melt-spun into a nine-filament yarn which in a separate operation was drawn to 44 dtex. The spin speed was 900 m/min. The winding yield of the spinning was 100%. The drawing yield was 96% for a draw ratio of 3.38:1. The tenacity was 5.42 cN/dtex with a breaking extension of 36%. There were 1.10 thick places per km and 0.053 warping faults per 100 km yarn length.

COMPARATIVE EXAMPLE A

A comparative test against the prior art was carried out with 0.15% by weight of propionic acid as chain regulator (see Table 1). To obtain extractables and relative viscosity values similar to Example 1, the throughput had to be reduced to 26 kg/h and the temperature of the first reaction zone had to be increased to 280° C. Otherwise the run was carried out as in Example 1. The product had an extractables content of 11.8%. After extraction, the RV was 2.53. After plant drying the Rv was 2.72 and A was 37 meq/kg. The winding yield of the spinning, the draw ratio and drawing yield had the same values as in Example 1. The tenacity was at 5.23 cN/dtex with a 35% extension somewhat less favorable than in Operative Example 1. The number of thick places at 1.06/km was at the same level as in Example 1. The number of warping faults at 0.067/100 km was raised compared with Example 1.

Operative Example 1 and Comparative Example A show that by using terephthalic acid as chain regulator the throughput of the present single-stage process was 46% higher than the prior art while the amino end group content and hence the anionic dyeability remained the same and, what is more, the processing characteristics and the mechanical properties of the yarns did not deteriorate but on the contrary improved somewhat.

EXAMPLE 2

Caprolactam was polymerized with 0.24% by weight of isophthalic acid as chain regulator as described in Example 1 (see Table 1). The temperature of the first reaction zone was set at 272° C. The other conditions of Example 1 were retained. The extractables content of the product was 12.0%. After plant extraction the RV was 2.56, A was 46 meq/kg and A+C was 119 meq/kg. After plant drying the RV was 2.69, A was 39 meq/kg and A+C was 107 meq/kg.

Spinning similar to Example 1 gave a winding yield of 100%. To obtain a similar breaking extension, the draw ratio was increased to 3.47:1. The drawing yield was 100% and the tenacity was 5.49 cN/dtex with an extension of 35%. The number of thick places (0.79/km) and warping faults (0.040/100 km) was even better than in Operative Example 1 and Comparative Example A.

COMPARATIVE EXAMPLE B

Caprolactam was polymerized with 0.21% by weight of adipic acid as chain regulator as described in Example 1 (see Table 1). In terms of mol % the regulator concentration was the same as in Example 1. To obtain similar values of extractables content and RV, the throughput had to be reduced to 33 kg/h. The end group content was the same as in Example 1.

This comparative example shows that the aliphatic dicarboxylic acid used therein does not speed up the caprolactam polymerization to the same extent as the chain regulators of the present invention. The space-time yield was some 13% lower than in Example 1.

COMPARATIVE EXAMPLE C

Caprolactam was polymerized with 0.25% by weight of benzoic acid as chain regulator as described in Example 1 (see Table 2). To obtain similar values of extractables content and RV, the throughput had to be reduced to 28 kg/h and the temperature of the first reaction zone had to be increased to 279° C. Otherwise the run was carried out as in Example 1. The amino end group content was at the same level as in Example 1.

This comparative example shows that the desired values of RV, extractables content and amino end group content are obtainable with benzoic acid as chain regulator in the present single-stage process only at the cost of a considerable reduction in the space-time yield.

COMPARATIVE EXAMPLE D

Caprolactam was polymerized with 0.09% by weight of benzoic acid as chain regulator as described in Example 1 (see Table 2). To obtain similar values of RV and extractables content, the throughput had to be set to 36 kg/h and the temperature of the first reaction zone to 268° C. Otherwise the run was carried out as in Operative Example 1 and Comparative Example C. The amino end group content was 57 meq/kg after extraction and 49 meq/kg after plant drying.

This comparative example shows that, although the desired values of RV and extractables content were obtainable with benzoic acid as chain regulator almost without loss of space-time yield compared with Operative Example 1, the low level of the amino end group content—and hence the high resistance to soiling—could not be maintained.

EXAMPLE 3

Caprolactam was polymerized with 0.50% by weight of terephthalic acid as chain regulator as described in Example 1 (see Table 1). The throughput was set to 33 kg/h and the temperature of the first reaction zone to 278° C. The other conditions of Example 1 were retained. The product had an extractables content of 11.3%. After extraction the RV was 2.35, A was 34 meq/kg and the sum total A+C was 130 meq/kg. After plant drying the RV was 2.69, A was 15 meq/kg and the sum total A+C was 96 meq/kg.

Spinning as per Example 1 gave a winding yield of 100%. To obtain a breaking extension similar to that of Example 1, the draw ratio was raised to 3.66:1. The spin-drawing yield was 100% and the tenacity was 5.56 cN/dtex with an extension of 34%. The number of thick places was 0.56/km.

The product was also processed in a single-stage spinning/drawing/texturing process into a 1,300-dtex 68-filament carpet yarn. This yarn, which had very good running properties, was found to have a tenacity of 3.1 cN/dtex and a breaking extension of 45%. A test dyeing with Ortolan Blue G produced a uniform, industry-standard depth of shade.

Using terephthalic acid as chain regulator it was thus possible to produce a product having a very low amino group content, and hence also a high resistance to soiling, which also possessed excellent processing and very good fiber properties.

EXAMPLE 4

Caprolactam was polymerized with 0.50% of terephthalic acid as chain regulator and in the presence of 0.27% of a 10% strength aqueous titanium dioxide suspension as described in Example 1. Produced at a throughput of 35 kg/h the product had an extractables content of 0.8%. After extraction the RV was 2.32, A was 37 meq/kg and the sum total A+C was 134 meq/kg. After plant drying the RV was 2.36, A was 33 meq/kg and the sum total A+C was 127 meq/kg. The titanium dioxide content was 0.03%.

The product was processed by the high-speed spinning process at a spin speed of 4,250 m/min. The 3-filament POY yarn obtained was drawn in a separate operation with a draw ratio of 1.33:1 to a count of 44 dtex. 1.1 faults per 100 kg were found at the drawing stage. The tenacity was 4.95 cN/dtex with a breaking extension of 35%.

No thick places were found.

For comparison a product produced as per the prior art with propionic acid as chain regulator and with the same relative viscosity and the same titanium dioxide content was processed. 0.7 faults per 100 kg were found at the drawing stage. The tenacity was 4.98 cN/dtex with a breaking extension of 35%. The number of thick places was 13/100 km. This shows that the product of the present invention had similar processing properties as a comparative prior art product even in the high-speed spinning process.

EXAMPLE 5

The polymerization reactor used was a reinforced plastic pipe without mechanical mixing in the first reaction zone. The reactor had a capacity of 290 l and was heated with an oil as heat transfer medium. To remove excess water, nitrogen was passed into the last reaction zone at a rate of 2 l per hour.

Molten caprolactam containing 1.4% by weight of water and 0.40% by weight of terephthalic acid as chain regulator was continuously introduced into the first reaction zone of the pipe under a gauge pressure of 0.53 bar. The throughput was 33.3 kg/h. The temperature of the first reaction zone was set to 272° C. The heat of polymerization released in the second reaction zone was removed by cooling with an internal heat exchanger. The temperature of the third reaction zone was 265° C. The product had an extractables content of 11.3%. After extraction the RV was 2.40, A was 37 and the sum total A+C was 130. After plant drying the RV was 2.68, A was 23 meq/kg and the sum total A+C was 102 meq/kg.

The product was successfully processed by the spinning/drawing/texturing process of Example 3 into a 1,300-dtex 68-filament carpet yarn.

TABLE 1

| Operative Example | 1 | | 2 | | 3 |
|---|---|---|---|---|---|
| Comparative Example | — | A | — | B | — |
| Chain regulator* | TPA | PA | IPA | ADA | TPA |
| Concentration % by weight | 0.24 | 0.15 | 0.24 | 0.21 | 0.50 |
| Throughput kg/h | 38.1 | 26.1 | 38.2 | 33.1 | 33.3 |
| Temperature °C. | | | | | |
| first reaction zone | 270 | 280 | 272 | 270 | 278 |
| last reaction zone | 265 | 265 | 265 | 265 | 265 |
| Extractables content % by weight | 11.0 | 11.8 | 12.0 | 11.3 | 11.3 |
| Product after extraction Relative viscosity | 2.51 | 2.53 | 2.56 | 2.55 | 2.35 |
| End group content meq/kg | | | | | |
| Amino (A) | 46 | 43 | 46 | 46 | 34 |
| Carboxyl (C) | 77 | 57 | 73 | 74 | 96 |
| Sum total A + C | 123 | 100 | 119 | 120 | 130 |
| Product after drying Relative viscosity | 2.72 | 2.72 | 2.69 | 2.70 | 2.69 |
| End group content meq/kg | | | | | |
| Amino (A) | 37 | 37 | 39 | 40 | 15 |
| Carboxyl (C) | 69 | 53 | 68 | 68 | 81 |
| Sum total A + C | 106 | 90 | 107 | 108 | 96 |
| Product after spinning | | | | | |
| Winding yield % | 100 | 100 | 100 | 100 | 100 |
| Draw ratio | 3.38 | 3.38 | 3.47 | 3.38 | 3.66 |
| Drawing yield % | 96 | 96 | 100 | 100 | 100 |
| Tenacity cN/dtex | 5.42 | 5.23 | 5.49 | 5.21 | 5.56 |
| Breaking extension % | 36 | 35 | 35 | 35 | 34 |
| Thick places per km | 1.10 | 1.06 | 0.79 | 1.26 | 0.56 |
| Warping faults per 100 kg | 0.053 | 0.067 | 0.040 | <0.01 | not determined |

*TPA = terephthalic acid,
ADA = adipic acid
IPA = isophthalic acid
PA = propionic acid

TABLE 2

| Operative Example | 1** | | |
|---|---|---|---|
| Comparative Example | — | C | D |
| Chain regulator* | TPA | BZA | BZA |
| Concentration % by weight | 0.24 | 0.25 | 0.09 |
| Throughput kg/h | 38.1 | 28.3 | 36.1 |
| Temperature °C. | | | |
| first reaction zone | 270 | 279 | 268 |
| last reaction zone | 265 | 265 | 265 |
| Extractables content % by weight | 11.0 | 11.9 | 11.5 |
| Product after extraction Relative viscosity | 2.51 | 2.53 | 2.53 |
| End group content meq/kg | | | |
| Amino (A) | 46 | 44 | 57 |
| Carboxyl (C) | 77 | 59 | 62 |
| Sum total A + C | 123 | 103 | 119 |
| Product after drying Relative viscosity | 2.72 | 2.70 | 2.72 |
| End group content meq/kg | | | |
| Amino (A) | 37 | 37 | 49 |
| Carboxy (C) | 69 | 54 | 55 |

TABLE 2-continued

| Operative Example | 1** | | |
|---|---|---|---|
| Comparative Example | — | C | D |
| Sum total A + C | 106 | 91 | 104 |

*TPA = terephthalic acid, BZA = benzoic acid
**Data taken from Table 1

We claim:

1. A process for the continuous production of polycaprolactam having a regulated amino end group content, in which caprolactam is polymerized at 240°–290° C. in the presence of water as initiator and in the presence of a dicarboxylic acid as chain regulator, which comprises polymerizing caprolactam in a single stage in the presence of from 0.3 to 5% by weight of water and from 0.1 to 0.6% by weight of terephthalic acid or isophthalic acid or of a mixture thereof, each percentage being based on caprolactam, at a uniform pressure through the entire polymerization time of from 1.0 to 1.9 bar, measured in the vapor phase above the polymerization zone, while maintaining a water content of from 0.1 to 0.5% by weight, until the sum total of the amino and carboxyl end group contents is from 115 to 150 meq/kg, with the proviso that the amino end group content does not drop below 25 meq/kg, measured on extracted polycaprolactam.

2. A process as claimed in claim 1, wherein a water content of from 0.1 to 0.4% by weight is maintained in the polycaprolactam melt.

3. A process as claimed in claim 1, wherein from 0.2 to 0.5% by weight of terephthalic acid or isophthalic acid or of a mixture thereof, based on caprolactam, is added.

4. A process as claimed in claim 1, wherein the extracted polycaprolactam has an amino end group content of from 30 to 60 meq/kg.

* * * * *